March 1, 1960 — S. M. MOBERG — 2,926,944
MULTIBAR SEAL
Filed June 6, 1958

INVENTOR:
SIGURD M. MOBERG
BY Robert Henderson
ATTORNEY

United States Patent Office 2,926,944
Patented Mar. 1, 1960

2,926,944

MULTIBAR SEAL

Sigurd M. Moberg, Pompton Plains, N.J., assignor to E. J. Brooks Company, Newark, N.J., a corporation of New Jersey Application June 6, 1958, Serial No. 740,370

3 Claims. (Cl. 292—315)

This invention relates generally to seals such as are used in slots of hasps or assemblies of parts which function somewhat like hasps in holding two members together. A good illustration of the general nature of such seals is to be found in seals which are employed in association with a hasp-like structure used to hold a cover of an electric meter in a covering position over mechanical parts of the meter.

More particularly, this invention relates to such a seal which, in a given size, is suitable for use in such hasp-like assemblies of different sizes. Although this invention is described herein with reference to its use for sealing an electric meter, it will be obvious that the invention would have other applications.

In hasp-like assemblies which are employed to hold a cover upon a meter, it is common practice for one of the meter elements to be fastened together to have a member with an aperture therein through which extends a tongue-like member integrally associated with the other of the two meter parts to be fastened together. In such assemblies, the tongue-like member is usually formed with a slot in the portion which protrudes from the mentioned aperture; and, for the purpose of preventing unintended withdrawal of the tongue-like member from said aperture, a seal which often is in the form of a wire or a strip of sheet metal is inserted through the mentioned slot and secured against accidental removal therefrom. Such seals are usually of such character that they would break if one were to attempt to use them a second time and, also, are not capable of being readily duplicated.

Tampering with a meter protected by such a seal would be prevented because of the fact that unauthorized persons would not have a replacement seal to replace the one which would be broken when removed or if reuse were attempted.

As the slots provided, on meters or related members, for reception therewithin of such seals, are of different sizes in different makes, sizes and types of meters, it has been necessary, heretofore, to provide seals of different sizes, each adapted to be used in association with a particular size of slot or in slots of a very narrow range of sizes. As a consequence, a seal manufacturer has been obliged to manufacture and sell such seals in a variety of sizes, thereby encountering manifold sizable outlays for tools and other expenses incidental to the maintenance of an adequate line of seals for his customers. Also, in some instances, a given user of such seals having meters with slots of different sizes therein must maintain a supply of seals of different sizes.

It is therefore an important object of this invention to provide a sheet-metal seal of the general character hereinbefore described which, in a given size, is very readily adaptable by the one using it for application to hasp-like assemblies having a fairly wide variety of slot sizes.

According to the broader aspects of this invention, there is provided a seal of strip metal having a head which is broader than the length of most and perhaps of all slots of various sizes in different hasp-like arrangements on meters. Integral with such a head is a narrower, elongate shank portion which is slitted longitudinally to form sealing fingers extending completely from the extremity of the shank portion to the point where it adjoins the head of the device. All or less than all of said fingers may be used in a slot, depending on the length of the slot; any finger or fingers, not to be used, being broken off by the user before insertion of the remaining finger or fingers in the slot.

A preferred embodiment of this invention is shown in the accompanying drawing for illustrative purposes without, however, limiting the invention to the particular disclosed embodiment.

Figure 1:
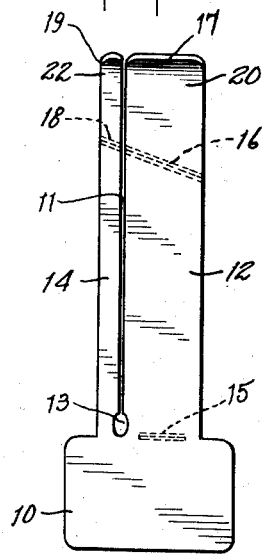
Figure 1 is an elevational view of what may be considered as the front face of a seal according to this invention.
Figure 2:
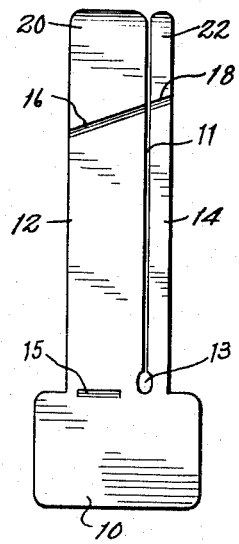
Fig. 2 is a similar elevational view of the opposite or rear face of said seal.

The seal is formed of flat sheet metal of a suitable thickness and composition to enable it to operate as hereinafter described. Figs. 1 and 2 show the seal as produced by the seal manufacturer and as delivered to the user. It is of sheet metal which is of substantially uniform thickness except as deformed, as hereinafter explained. The seal has a head 10 and a shank consisting of a relatively wide sealing finger 12 and a relatively narrow sealing finger 14; the said fingers being separated by a slit 11 extending completely through the metal and entirely from the tip or free ends of the fingers approximately to a point where the fingers integrally adjoin the head 10. At the inner end of the slit, there is preferably provided a small aperture 13, the principal effect of which is to assure that bending or breaking away of one finger will not in any way impair the integral association of the other finger with the head.

Extending transversely at the base of the wide finger 12, there is preferably provided a groove or score 15, or other suitable line of weakness, somewhat shorter than the width of finger 12, to facilitate breakage of that finger from the seal, if such breakage is desired by the user. Such a line of weakness may be omitted on the narrower finger 14 as that finger, by reason of its narrow dimension, may easily be broken away from the device, if that is desired by the user.

The extremities of the fingers 12 and 14 are preferably bent slightly forwardly, as at 17 and 19, to facilitate entry thereof into a slot in a hasp-like assembly of a meter. Somewhat inwardly of the extremities of the fingers 12 and 14, they are provided with oblique lines of weakness 16, 18 defining foldable sealing portions 20, 22, respectively, on said fingers.

Figure 3:
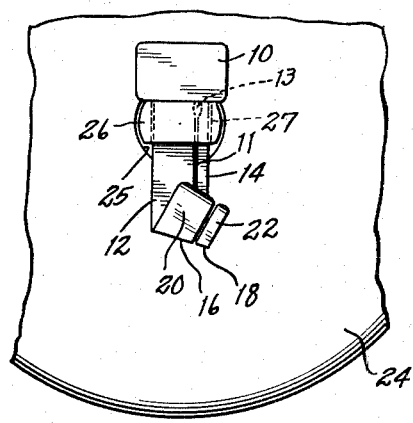
Fig. 3 is an elevational view of said seal as disposed in and sealed in a relatively long slot in a hasp-like assembly.
Figure 4:
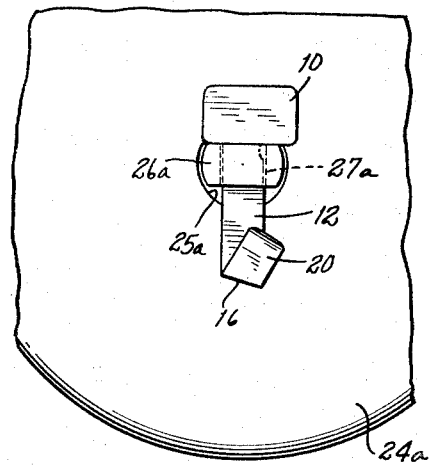
Fig. 4 is an elevational view similar to Fig. 3 but showing said seal as disposed in and sealed in a somewhat shorter slot in a hasp-like assembly.
Figure 5:
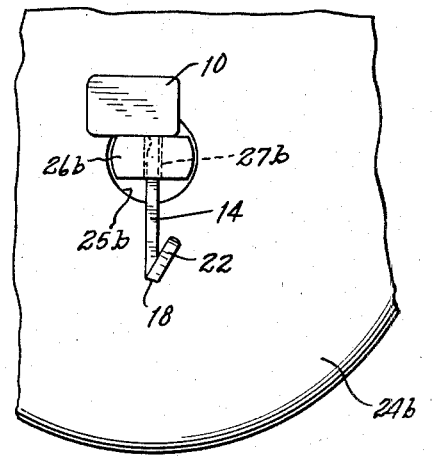
Fig. 5 is an elevational view similar to Fig. 3 but showing said seal in a still shorter slot in a hasp-like assembly.

Figs. 3, 4 and 5 show hasp assemblies including, respectively, hasp plates 24, 24a, 24b (which, for example, may be meter covers), having openings or apertures 25, 25a, 25b through which extend members in the nature of hasp staples 26, 26a, 26b, each having therein a different size slot 27, 27a, 27b.

It will be understood that a device such as is shown in Figs. 1 and 2 is usable in any one of the hasp arrangements shown in Figs. 3, 4 and 5. In using said seal in the structure of Fig. 3, having a long slot 27, the seal is employed with both fingers 12 and 14 remaining intact. To adapt said seal for use in the structure of Fig. 4, having a somewhat shorter slot, the user of the seal, before applying it to the hasp-like arrangement, merely breaks away the narrow finger 14 and inserts the finger 12 through slot 27a. In utilizing the same seal with respect to a hasp arrangement such as is shown in Fig. 5, having a still shorter slot, the user leaves narrow finger 14 intact but breaks away wide finger 12 before applying the seal to the hasp assembly. In each of the three just-described arrangements, the device is closed or sealed, after insertion in a related slot, by folding of the sealing portion or portions 20, 22 forwardly over the remaining portions of the fingers 12 and 14 along the oblique lines 16, 18.

As the oblique lines 16, 18 are lines of weakness which not only localize the folding of the sealing portions at a definite fold line but also weaken the metal along that line, it follows that, assuming that there has been a proper selection of metal in manufacturing the seal, any unbending of the portions 20, 22, or either of them, to remove the seal, almost certainly would cause the sealing portion or portions 20 or 22 to break away from the remainder of the seal, thus making the seal non-reusable. However, if such mere unbending does not cause such breakage, it is certain that any attempt to bend those portions again, in order to reuse the seal, would cause them to break away, thereby defeating such attempted reuse.

It should be obvious that what are shown and spoken of herein as oblique lines of weakness may, instead, be lines of weakness that extend normally rather than obliquely across the several fingers of the seals; also, that such oblique lines of weakness could be provided at different oblique angles.

It should be understood that the present inventive concept may be utilized in various ways other than shown and described herein without departing from the invention as set forth in the following claims.

I claim:

1. A seal for use in a slot, said seal being of sheet material and comprising a head and a shank which is narrower than said head and extends from one side of the latter; said shank comprising plural sealing fingers adjoining said head in side-by-side, parallel relationship, in a common plane, said fingers being of different widths and each having a transverse line of weakness, distal from said head, adapted to induce breakage upon repeated bending thereat; each of said fingers being breakable at its juncture with said head to permit its separation from the latter whereby any one of said fingers may be separated from the head to adapt the seal for use in slots of various lengths.

2. A seal according to claim 1, further including a transverse line of weakness at the juncture of one of said fingers with said head, to facilitate separation of said one finger from the head of the device; opposite ends of said last-mentioned line of weakness being spaced from side edges of said one of said fingers to reduce the possibility of unintended breakage at said last-mentioned line of weakness.

3. A seal according to claim 1, wherein one of said fingers is separated from an adjacent finger by a slit and wherein an aperture of continuous curvature is formed at the inner end of such a slit to permit one of said fingers to be broken away from the head of the device without impairing the connection of the other of said fingers with said head.

References Cited in the file of this patent

UNITED STATES PATENTS 972,971     Wood _____ Oct. 18, 1910